US008149559B2

(12) United States Patent
Kakehi et al.

(10) Patent No.: US 8,149,559 B2
(45) Date of Patent: Apr. 3, 2012

(54) PIEZOELECTRIC ACTUATOR DRIVING DEVICE AND METHOD

(75) Inventors: Tatsuya Kakehi, Anjo (JP); Noboru Nagase, Anjo (JP)

(73) Assignee: Denso Corporation, Kariya (JP)

( * ) Notice: Subject to any disclaimer, the term of this patent is extended or adjusted under 35 U.S.C. 154(b) by 444 days.

(21) Appl. No.: 12/213,167

(22) Filed: Jun. 16, 2008

(65) Prior Publication Data

US 2008/0316671 A1 Dec. 25, 2008

(30) Foreign Application Priority Data

Jun. 22, 2007 (JP) ................................ 2007-165138

(51) Int. Cl.
*H01H 57/00* (2006.01)

(52) U.S. Cl. ....................................... 361/207; 361/153

(58) Field of Classification Search .................. 361/153, 361/207

See application file for complete search history.

(56) References Cited

U.S. PATENT DOCUMENTS

| | | | | |
|---|---|---|---|---|
| 5,350,962 | A | 9/1994 | Sakaida et al. | |
| 5,387,834 | A | 2/1995 | Suzuki | |
| 5,982,145 | A * | 11/1999 | Eguchi | 320/128 |
| 6,459,244 | B1 * | 10/2002 | Hoffmann et al. | 320/166 |
| 6,539,925 | B2 * | 4/2003 | Rueger et al. | 123/490 |

FOREIGN PATENT DOCUMENTS

| | | |
|---|---|---|
| DE | 10 2005 054 680 | 6/2006 |
| JP | 04-067783 | 3/1992 |
| JP | 2002-136156 | 5/2002 |
| JP | 2003-333832 | 11/2003 |
| JP | 2006-237335 | 9/2006 |

OTHER PUBLICATIONS

Japanese Office Action dated Jan. 20, 2009, issued in corresponding Japanese Application No. 2007-165138, with English translation.

European extended Search Report dated Jan. 13, 2009 issued in corresponding European Application No. 08010611.5-2222.

* cited by examiner

*Primary Examiner* — Jared Fureman
*Assistant Examiner* — Tien Mai
(74) *Attorney, Agent, or Firm* — Nixon & Vanderhye P.C.

(57) ABSTRACT

A driving device for a piezoelectric actuator supplies charges and discharges the piezoelectric actuator through a charging switch and a discharging switch, respectively. The charging switch is repeatedly turned on and off thereby to charge and expand the piezoelectric actuator. The discharging switch is repeatedly turned on and off thereby to discharge and contract the piezoelectric actuator. The discharging switch is kept ON especially during a period from when the discharging switching control is terminated to when the charging switching control is started next. Thus, the piezoelectric voltage at the start of the next driving can be made substantially 0V.

10 Claims, 10 Drawing Sheets

PIEZOELECTRIC ACTUATOR DRIVING DEVICE AND METHOD

CROSS REFERENCE TO RELATED APPLICATION

This application is based on and incorporates herein by reference Japanese Patent Application No. 2007-165138 filed on Jun. 22, 2007.

FIELD OF THE INVENTION

The present invention relates to a device and method for driving a piezoelectric actuator.

BACKGROUND OF THE INVENTION

A piezoelectric actuator, which expands and contracts by charging and discharging, is used to linearly move a piston or the like. For instance, as disclosed in JP-A-2002-136156, a fuel injection system for an internal combustion engine uses such a piezoelectric actuator so that an on/off-valve of a fuel injector for fuel injection is switched thereby.

More specifically, as illustrated in FIG. 10A, a driving device is constructed to charge and discharge a piezoelectric actuator to expand and contract it. In this driving device, a series circuit 3 of an inductor 1 and a piezoelectric actuator 2 is provided with: a charging path 6 for supplying power from the positive side of a direct current power source 5 through a charging switch 4 constructed with MOSFET; and a discharging path 8, connected in parallel with the series circuit 3, for discharging the charged electric charges of the piezoelectric actuator 2 through a discharging switch 7 constructed with MOSFET.

The piezoelectric actuator 2 in this example is provided in an injector for injecting fuel into any of the multiple cylinders of an internal combustion engine and opens the injector when it is expanded. Other multiple piezoelectric actuators are connected in series with the inductor 1 and in parallel with the piezoelectric actuator 2. For this reason, the terminal (negative terminal) of each of the parallel-connected piezoelectric actuators 2 on the opposite side to the inductor 1 is connected to a ground on the negative side of the direct current power source 5 through a selector switch 9. Each selector switch (also referred to as a cylinder selector switch) 9 is for selecting one of the parallel-connected piezoelectric actuators 2 as an object to be driven. The selector switch 9 is kept ON during a period in which fuel is injected into the cylinder.

In this example, the selector switch 9 is also MOSFET, and the diodes 4*a*, 7*a*, 9*a* are parasitic diodes of the respective MOSFETs forming the switches 4, 7, 9.

When a driving signal instructing driving of the piezoelectric actuator 2 is externally inputted, the selector switch 9 is turned on and further charging switching control is carried out. In this charging switching control, the charging switch 4 is repeatedly turned on and off with the discharging switch 7 kept OFF, so that the piezoelectric actuator 2 is thereby charged and expanded. When the input of the driving signal is thereafter ceased, discharging switching control is carried out. In this discharging switching control, the discharging switch 7 is repeatedly turned on and off with the charging switch 4 kept OFF, so that the piezoelectric actuator 2 is thereby discharged and contracted.

During the charging period, specifically, the following operation is repeated: the charging switch 4 is turned on with the discharging switch 7 OFF and a charging current is thereby led to flow from the direct current power source 5 to the piezoelectric actuator 2 through the charging path 6; thereafter, the charging switch 4 is turned off; and a charging current (i.e., flywheel current) passed by energy accumulated in the inductor 1 is thereby led to flow. This charging current flows from the negative side to the positive side of the piezoelectric actuator 2 through the parasitic diode 7*a* of the MOSFET forming the discharging switch 7. The piezoelectric actuator 2 is charged stepwise by repeating the above procedure.

During the discharging period, meanwhile, the following operation is repeated: the discharging switch 7 is turned on with the charging switch 4 OFF and a discharging current is thereby led to flow from the positive side of the piezoelectric actuator 2 to the discharging path 8 through the inductor 1; thereafter, the discharging switch 7 is turned off; a discharging current is thereby led to flow from the positive side of the piezoelectric actuator 2 to the direct current power source 5 through the inductor 1 and the parasitic diode 4*a* of the MOSFET forming the charging switch 4; and the electric charges in the piezoelectric actuator 2 is recovered to the direct current power source 5 by this discharging current. The piezoelectric actuator 2 is discharged stepwise by repeating the above procedure.

In this type of driving device, as illustrated in FIG. 10B, the charging voltage (hereafter, also referred to as a piezoelectric voltage) of the piezoelectric actuator 2 is monitored while the above discharging switching control is being carried out. When it is determined that the charging voltage has become equal to or lower than a discharge termination target value set slightly higher than 0V, the discharging switching control is terminated and the discharging switch 7 is kept OFF.

The discharging current in FIG. 10B refers to the discharging current of the piezoelectric actuator 2. FIG. 10B illustrates the waveform of the discharging current and the state of turn-on and turn-off of the discharging switch 7 observed when the following control is carried out as the discharging switching control: each time the discharging current has risen to a preset upper-limit value after a driving signal is changed to the low level, the discharging switch 7 is caused to switch from ON to OFF; and each time the discharging current has fallen to a preset lower-limit value, the discharging switch 7 is caused to switch from OFF to ON.

When the piezoelectric actuator 2 is discharged by the discharging switching control, the capacitance of a piezoelectric element forming the piezoelectric actuator 2 varies. Therefore, the piezoelectric voltage fluctuates and drops as illustrated in FIG. 11A.

For this reason, variation is produced in the piezoelectric voltage after the termination of discharging switching control. As a result, the piezoelectric voltage drops to a value close to 0V in some cases and does not in other cases.

With this variation in piezoelectric voltage, the following takes place when charging switching control is carried out next to drive the piezoelectric actuator: the time from when the charging switching control is started to when the piezoelectric actuator starts to expand and the time it takes the piezoelectric actuator to expand by a desired amount vary. This degrades the driving accuracy.

As a fuel injection system for a vehicle diesel engine, a diesel common rail system (hereafter, abbreviated as CRS) also uses a piezoelectric actuator in an injector so that high-pressure fuel accumulated in a common rail is injected from the injector.

Because of the fuel pressure in the common rail, pressure is applied to the piezoelectric element forming the piezoelectric actuator 2, and this pressure may produce voltage in the piezoelectric element by the piezoelectric phenomenon. For this reason, after the termination of discharging switching control, the piezoelectric voltage is gradually increased as illustrated at part A in FIG. 11B. The quiescent period (injection interval) from the termination of the current fuel injection to the start of the next fuel injection varies according to the operating state of the engine or the like as illustrated at part B in FIG. 11B. This leads to variation in the piezoelectric voltage when charging switching control is started for the next fuel injection.

Consequently, also in the CRS, the time for the piezoelectric actuator 2 to expand by a desired amount after the start of charging switching control varies. As a result, the injector opening timing varies and this varies the fuel injection quantity.

The CRS is so constructed that multistage injection, in which fuel is injected into one cylinder more than once, is carried out to more finely control the injection quantity and the injection timing to suppress deterioration in emission. When the accuracy of driving of the piezoelectric actuator is degraded, the CRS cannot attain expected performance.

SUMMARY OF THE INVENTION

The invention therefore has an object to enhance the accuracy of driving of a piezoelectric actuator.

According to an aspect of the present invention, a piezoelectric actuator is connected in series with a charging switch and in parallel with a discharging switch, both switches being controlled by a control unit. In charging switching control performed in response to a drive start command for the piezoelectric actuator, the charging switch is turned on and off alternately thereby to charge the piezoelectric actuator with electric power from a power source circuit. In discharging switching control performed in response to a drive stop command for the piezoelectric actuator, the discharging switch is turned on and off alternately thereby to discharge the piezoelectric actuator. The discharging switch is turned on in a period from when the discharging switching control is terminated to when the charging switching control is started next in which the discharging switch is kept OFF.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS (First Embodiment)

Figure 1:
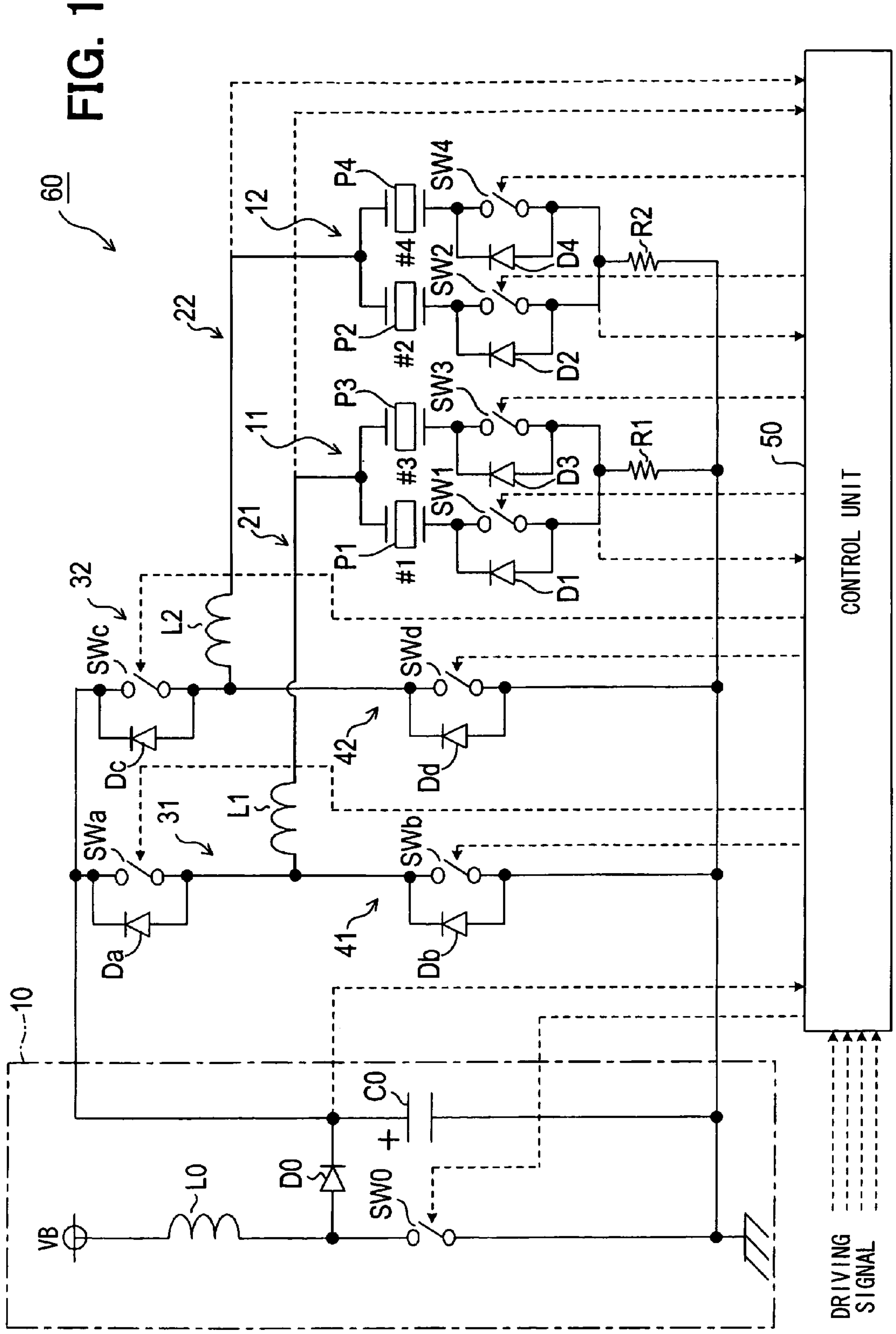
FIG. 1 is a block diagram illustrating a piezoelectric actuator driving device according to a first embodiment.

Referring first to FIG. 1, a piezoelectric actuator driving device 60 is used in a fuel injection system for a diesel engine mounted in a vehicle. It is so constructed that the following is implemented: piezoelectric actuators P1 to P4 provided in respective injectors for injecting high-pressure fuel from a common rail into the respective cylinders of the diesel engine are charged and discharged and thereby expanded or contracted; and the injector of each cylinder is thereby caused to start and stop fuel injection. The number of cylinders of the engine is assumed to be four, and piezoelectric actuator Pn (n is any of 1 to 4) corresponds to the n-th cylinder (hereafter, also specified as #n). Further, in the driving device 60, the cylinders of the engine are grouped by two. The first cylinder #1 and the third cylinder #3 are grouped into a first group, and the second cylinder #2 and the fourth cylinder #4 are grouped into a second group.

The driving device 60 includes the following as components common to the piezoelectric actuators P1 to P4 in both groups: a power supply circuit 10 that increases battery voltage VB (e.g., 12V or 24V) from a vehicle battery and outputs it; and a control unit 50 constructed with a microcomputer, a dedicated IC, and the like for controlling the operation of the driving device 60. The control unit 50 is electrically connected to the driving device 60 as shown by dotted lines.

The power supply circuit 10 is a known DC-DC converter and includes: a voltage step-up inductor L0 supplied at one end with the battery voltage VB; a voltage boosting switch SW0 connected between the other end of the voltage step-up inductor L0 and the ground; a diode D0 whose anode is connected to the point of junction between the voltage step-up inductor L0 and the voltage boosting switch SW0; and a capacitor C0 connected between the cathode of the diode D0 and the ground.

In this power supply circuit 10, the following takes place by the voltage boosting switch SW0 being turned on and off: a flyback voltage higher than the battery voltage VB is produced at the point of junction between the voltage step-up inductor L0 and the voltage boosting switch SW0; and the capacitor C0 is charged by the flyback voltage through the diode D0. For this reason, the control unit 50 detects the charging voltage of the capacitor C0 and turns on and off the voltage boosting switch SW0 so that the charging voltage becomes equal to a target value of tens to hundreds of volts.

The diode D0 is for preventing discharge from the capacitor C0 to the voltage boosting switch SW0 side. In the power supply circuit 10, the positive terminal as a terminal of the capacitor C0 on the diode D0 side is on the positive side of the power supply circuit 10. The negative terminal of the capacitor C0 and the ground are on the negative side of the power supply circuit 10. In this driving device 60, power is supplied from the capacitor C0 to each of the piezoelectric actuators P1 to P4. For this reason, the capacitance of the capacitor C0 is set to a relatively large value so that a substantially constant voltage value can be maintained even when power is supplied to the piezoelectric actuators P1 to P4.

In addition, the driving device 60 includes the following components with respect to the piezoelectric actuators P1, P3 in the first group:

The driving device 60 includes: an inductor L1 connected in series with a parallel circuit 11 in which the piezoelectric actuators P1, P3 are connected in parallel; a charging path 31 for supplying electric power to a series circuit 21 of the inductor L1 and the parallel circuit 11 from the positive side of the power supply circuit 10 (i.e., the positive terminal of the capacitor C0) through a charging switch SWa; and a discharging path 41 that is connected in parallel with the series circuit 21 and is for discharging the charged electric charges of the piezoelectric actuators P1, P3 through a discharging switch SWb.

The parallel circuit 11 is constructed by connecting the following elements in parallel: a series circuit constructed with the piezoelectric actuator P1 and a cylinder selector switch SW1 for selecting it as an object to be driven; and a series circuit constructed with the piezoelectric actuator P3 and a cylinder selector switch SW3 for selecting it as an object to be driven. The end of the parallel circuit 11 on the side of the piezoelectric actuators P1, P3 is connected to one end of the inductor L1. Its end on the side of the cylinder selector switches SW1, SW3 is connected to the ground on the negative side of the power supply circuit 10 through a resistor R1. The cylinder selector switches SW1, SW3 have diodes D1, D3 respectively connected in parallel with them with their cathodes connected to the side of the piezoelectric actuators P1, P3 and with their anodes connected to the resistor R1 side.

The resistor R1 is a current sensing resistor for detecting currents (charging current and discharging current) passing through the piezoelectric actuators P1, P3. Each of the cylinder selector switches SW1, SW3 is constructed with an n-channel MOSFET with its drain connected to one end of the corresponding piezoelectric actuator P1, P3 and its source connected to one end of the resistor R1. The parasitic diodes of these MOSFETs are utilized as the diodes D1, D3.

The series circuit 21 has its end on the inductor L1 side connected to the positive terminal of the capacitor C0 through the charging switch SWa. The charging switch SWa has a diode Da connected in parallel with it with its cathode connected on the capacitor C0 side. When the piezoelectric actuators P1, P3 are discharged, this diode Da functions to cause a regenerative current flow into the capacitor C0 in the power supply circuit 10 when the discharging switch SWb is caused to switch from ON to OFF.

The charging switch SWa is constructed with an n-channel MOSFET with its drain connected to the positive terminal of the capacitor C0 and its source connected to one end of the inductor L1. The parasitic diode of this MOSFET is utilized as the diode Da.

When the discharging switch SWb is turned on, it forms the discharging path 41. This discharging switch SWb is also constructed with an n-channel MOSFET Its source is connected to the ground and its drain is connected to the point of junction between the charging switch SWa and the inductor L1.

In addition, the discharging switch SWb has a diode Db connected in parallel with it with its anode connected on the ground side. When the piezoelectric actuators P1, P3 are charged, this diode Db functions to cause a flywheel current from the inductor L1 flow when the charging switch SWa is caused to switch from ON to OFF. This diode Db is also the parasitic diode of the MOSFET forming the discharging switch SWb.

The driving device 60 includes exactly the same components as with respect to the piezoelectric actuators P1, P3 also with respect to the piezoelectric actuators P2, P4 in the second group.

That is, the driving device 60 includes: an inductor L2 connected in series with a parallel circuit 12 in which the piezoelectric actuators P2, P4 are connected in parallel; a charging path 32 for supplying electric power to a series circuit 22 of the inductor L2 and the parallel circuit 12 from the positive terminal of the capacitor C0 through a charging switch SWc; and a discharging path 42 that is connected in parallel with the series circuit 22 and is for discharging the charged electric charges of the piezoelectric actuators P2, P4 through a discharging switch SWd.

The parallel circuit 12 is constructed by connecting the following elements in parallel: a series circuit constructed with the piezoelectric actuator P2 and a cylinder selector switch SW2 for selecting it as an object to be driven; and a series circuit constructed with the piezoelectric actuator P4 and a cylinder selector switch SW4 for selecting it as an object to be driven. The end of the parallel circuit 12 on the side of the piezoelectric actuators P2, P4 is connected to one end of the inductor L2. Its end on the side of the cylinder selector switches SW2, SW4 is connected to the ground through a resistor R2. The cylinder selector switches SW2, SW4 have diodes D2, D4 respectively connected in parallel with them with their cathodes connected on the side of the piezoelectric actuators P2, P4.

The resistor R2 is a current sensing resistor for detecting currents passing through the piezoelectric actuators P2, P4. Each of the cylinder selector switches SW2, SW4 is constructed with an n-channel MOSFET with its drain connected to one end of the corresponding piezoelectric actuator P2, P4 and its source connected to one end of the resistor R2. The parasitic diodes of these MOSFETs are utilized as the diodes D2, D4.

The series circuit 22 has its end on the inductor L2 side connected to the positive terminal of the capacitor C0 through the charging switch SWc. The charging switch SWc has a diode Dc connected in parallel with it with its cathode connected on the capacitor C0 side. When the piezoelectric actuators P2, P4 are discharged, this diode Dc functions to cause a regenerative current flow into the capacitor C0 in the power supply circuit 10 when the discharging switch SWd is caused to switch from ON to OFF.

The charging switch SWc is constructed with an n-channel MOSFET with its drain connected to the positive terminal of the capacitor C0 and its source connected to one end of the inductor L2. The parasitic diode of this MOSFET is utilized as the diode Dc.

When the discharging switch SWd is turned on, it forms the discharging path 42. This discharging switch SWd is also constructed with an n-channel MOSFET. Its source is connected to the ground and its drain is connected to the point of junction between the charging switch SWc and the inductor L2.

In addition, the discharging switch SWd has a diode Dd connected in parallel with it with its anode connected on the ground side. When the piezoelectric actuators P2, P4 are charged, this diode Dd functions to cause a flywheel current from the inductor L2 flow when the charging switch SWc is caused to switch from ON to OFF. This diode Dd is also the parasitic diode of the MOSFET forming the discharging switch SWd.

In this driving device 60, the control unit 50 controls not only the voltage boosting switch SW0 in the power supply circuit 10. It also controls the charging switches SWa, SWc, discharging switches SWb, SWd, and cylinder selector switches SW1 to SW4.

In operation, the control unit 50 monitors the voltages of the resistors R1, R2. It thereby detects the charging current and the discharging current passing through the piezoelectric actuator, which is driven as an object to be driven. Further, the control unit 50 detects the charging voltage (piezoelectric voltage) of the piezoelectric actuator by the voltage at the ends of the parallel circuits 11, 12 on the side of the inductors L1, L2. In addition, the control unit 50 is inputted with a driving signal (injection command signal) for each cylinder from an electronic control unit (not shown) that controls the engine of the vehicle to open the injector of the corresponding cylinder in the known manner. When the driving device 60 is provided in the electronic control unit, the control unit 50 is inputted with a driving signal for each cylinder from the microcomputer in the electronic control unit.

In the following description, a case where the piezoelectric actuator P1 of the first cylinder #1 is to be driven will be taken as an example.

Figure 2:
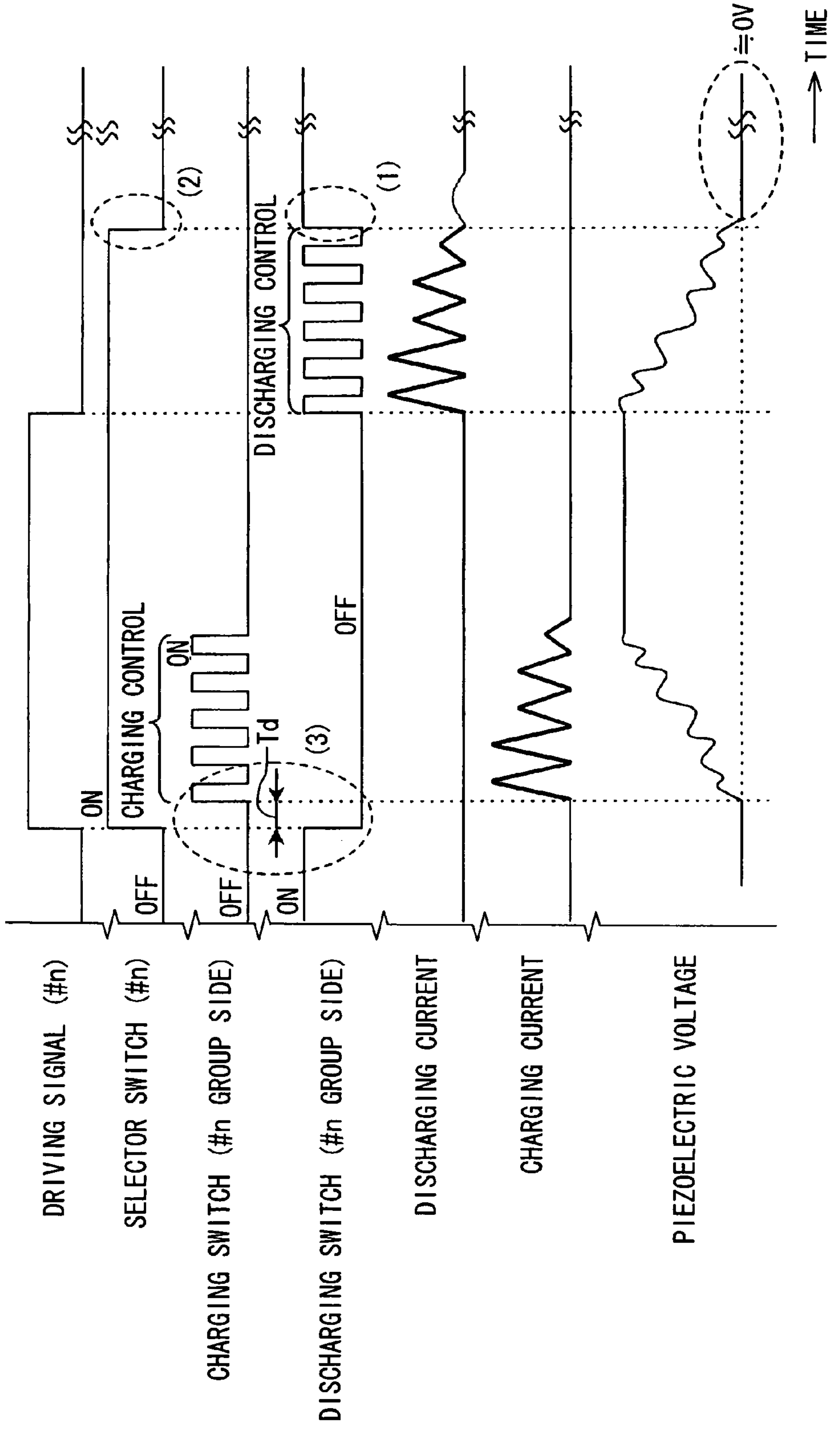
FIG. 2 is an operation diagram illustrating the operation of a control unit in the first embodiment.

When a level of the driving signal for #1 from the electronic control unit becomes high to command fuel injection, the control unit 50 performs the operation illustrated in FIG. 2. That is, it turns on the cylinder selector switch SW1 corresponding to #1 of the cylinder selector switches SW1 to SW4. Further, it carries out charging switching control with the discharging switch SWb for the first group, to which #1 belongs, kept OFF. In this charging switching control, the control unit 50 turns on and off the charging switch SWa for the first group.

As a result, the following takes place: when the charging switch SWa is ON, a charging current flows from the capacitor C0 in the power supply circuit 10 to the piezoelectric actuator P1 through the charging path 31 and the inductor L1; and when the charging switch SWa is OFF, a charging current resulting from by the energy accumulated in the inductor L1 flows from the ground side to the piezoelectric actuator P1 through the diode Db parallel with the discharging switch SWb. As a result of this charging switching control, the piezoelectric actuator P1 is charged stepwise and expanded and the injector of #1 is opened.

In this charging switching control, for example, the control unit 50 repeats the following operation: when it determines that the charging current passing through the piezoelectric actuator P1 to be driven has risen to a preset switching-off threshold value, it causes the charging switch Swa to switch from ON to OFF; and when it determines that the charging current has fallen to a preset switching-on threshold value (<switching-off threshold value), it causes the charging switch SWa to switch from OFF to ON. In the charging switching control, for example, the control unit 50 may carry out control to repeat the following operation: the charging switch SWa is kept ON for a certain on-period and then kept OFF for a certain off-period. When the control unit 50 is carrying out charging switching control, for example, it performs the following operation: when it determines that the charging voltage of the piezoelectric actuator P1 to be driven has become equal to or higher than a charge termination target value at which the injector can be opened without fail, it terminates the charging switching control and keeps the charging switch SWa OFF.

When the driving signal for #1 is thereafter changed form high to low, as illustrated in FIG. 2, the control unit 50 carries out the discharging switching control with the charging switch SWa for the first group, to which #1 belongs, kept OFF. In this discharging switching control, it turns on and off the discharging switch SWb for the first group.

Thus, when the discharging switch SWb is ON, a discharging current flows from the positive side of the piezoelectric actuator P1 to the ground side through the inductor L1 and the discharging path 41. When the discharging switch SWb is OFF, the discharging current flows from the positive side of the piezoelectric actuator P1 to the capacitor C0 through the inductor L1 and the diode Da parallel with the charging switch SWa. The electric charge of the piezoelectric actuator P1 is thus recovered to the capacitor C0 by this discharging current. The piezoelectric actuator P1 is discharged stepwise and contracted by this discharging switching control and the injector of #1 is closed.

In this discharging switching control, for example, the control unit 50 repeats the following operation: when it determines that the discharging current passing through the piezoelectric actuator P1 to be driven has risen to a preset switching-off threshold value, it causes the discharging switch SWb to switch from ON to OFF; and when it determines that the discharging current has fallen to a preset switching-on threshold value (<switching-off threshold value), it causes the discharging switch SWb to switch from OFF to ON. In the discharging switching control, for example, the control unit 50 may carry out control to repeat the following operation: the discharging switch SWb is kept ON for a certain on-period and then kept OFF for a certain off-period.

Figure 3A:
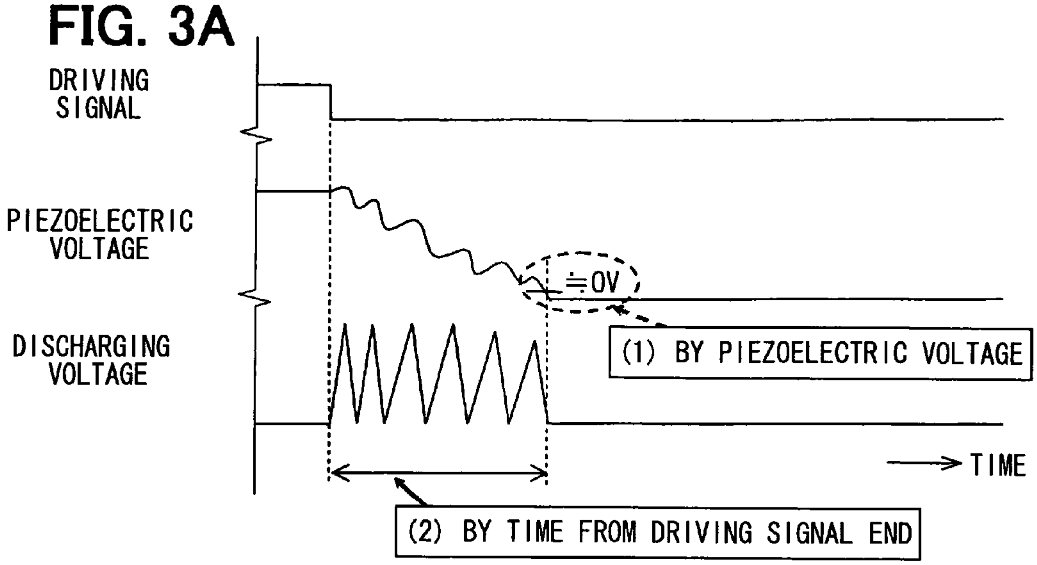
FIG. 3A is an operation diagram illustrating a discharge termination condition.

When the control unit 50 carries out the discharging switching control, it performs the following operation: when it determines that a monitored charging voltage of the piezoelectric actuator P1 to be driven has become equal to or lower than a discharge termination target value set slightly higher than 0V as illustrated at part (1) in FIG. 3A, it operates as follow: it determines that a discharge termination condition has been satisfied and terminates the discharging switching control (i.e., switching on and off of the discharging switch). The above discharge termination target value is a specified value.

Fuel injection is carried out in the order of #1→#2→#3→#4→#1. At this time, multistage injection is carried out and fuel is injected into one cylinder more than once.

Figure 4:
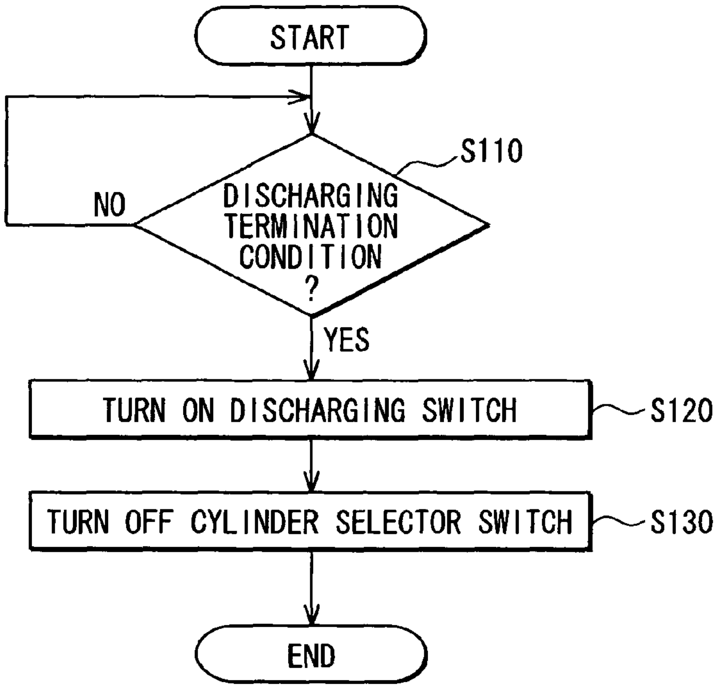
FIG. 4 is a flowchart illustrating a control operation carried out by a control unit in the first embodiment when discharging switching control is terminated.

Description will be given with #1 taken as an example. During the following period, the control unit 50 operates as described below during the period from point A in time to point B in time. The point A in time is when a driving signal for #1 is driven high for the first time around. (That is, the point A in time is when the driving signal for #1 is driven high for the first injection of multistage injection.) The point B in time is when a driving signal for #3, belonging to the same group as #1 does, is driven high for the first time around. During this period, the control unit 50 operates as illustrated at parts (1) and (2) in FIG. 2 and FIG. 4. That is, when it determines that a discharge termination condition has been satisfied while it is carrying out discharging switching control (S110: YES), it turns on the discharging switch SWb to terminate the discharging switching control (S120). Further, it turns off the cylinder selector switch SW1 that has been ON so far (S130).

When the driving signal for #1 is changed to high next (that is, when the signal is driven high for the second and following injections of multistage injection), the control unit 50 operates as illustrated in FIG. 2. That is, it turns on the cylinder selector switch SW1 again and causes the discharging switch SWb to switch from ON to OFF. Thereafter, it waits by a predetermined very short delay time Td and then starts the first turn-on of the charging switch SWa in the charging switching control as shown by part (3) in FIG. 2. Thus, at start of the charging switching control, the control unit 50 causes the discharging switch SWb to switch from ON to OFF before it turns on the charging switch SWa for the first time around. Thereafter, it starts turn-on and turn-off of the charging switch SWa. The purpose of this is to prevent the following phenomenon without fail: both the charging switch SWa and the discharging switch SWb are simultaneously turned on and a through current is passed through the switches SWa, SWb.

When multistage injection for #1 is entirely completed and then a driving signal for #3 is changed to high, the cylinder selector switch SW1 for #1 is kept OFF and the cylinder selector switch SW3 for #3 is turned on and off as illustrated as part (3) in FIG. 2. The charging switch SWa and the discharging switch SWb are controlled similarly with multistage injection for #1. The description made with reference to #1 and #3 as an example also applies to #2 and #4 in the second group. When the piezoelectric actuators P2, P4 are driven, however, the charging switch SWc and the discharging switch SWd are turned on and off in place of the charging switch SWa and the discharging switch SWb.

In the driving device 60, assuming that a cylinder in which fuel is injected is #n, the discharging switch SWb or SWc corresponding to the group of #n is kept ON during the driving stop period in the period of multistage injection into #n. The driving stop period is from the time point when the driving signal for #n is changed to low and the discharging switching control on the piezoelectric actuator Pn is terminated to the time point when the driving signal for #n is changed to high next and the charging switching control on the piezoelectric actuator Pn is started again. That is, the driving stop period is an injection cessation period in multistage injection and hereafter it will be simply referred to as driving stop period.

Figure 5:
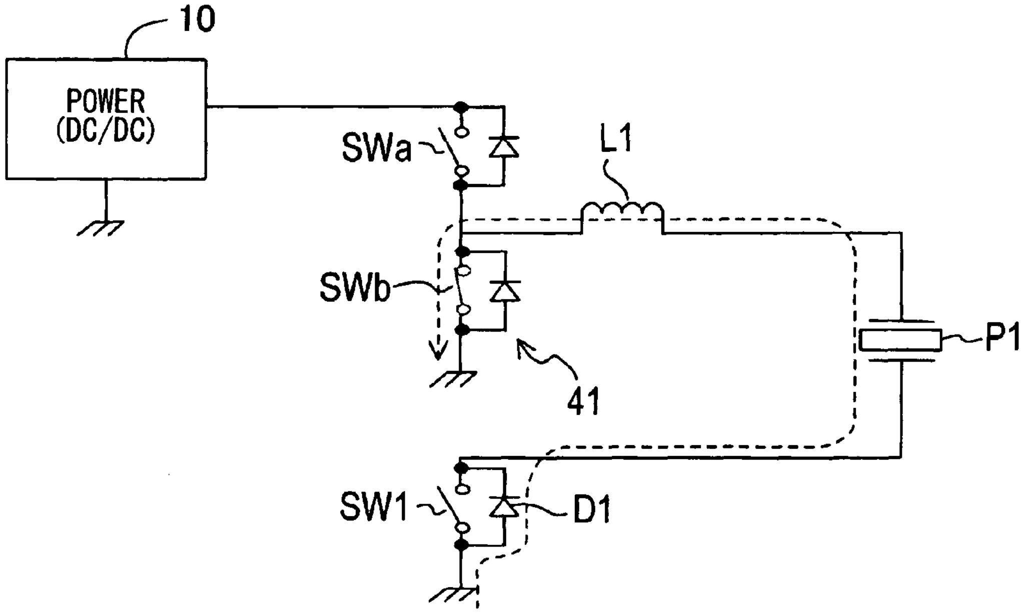
FIG. 5 is a schematic diagram illustrating an operation mode of the first embodiment.

For this reason, the driving device 60 operates as illustrated in FIG. 5 by taking the piezoelectric actuator P1 of #1 taken as an example. That is, during the driving stop period, the discharging switch SWb is kept ON to continuously maintain the discharging path 41, but the cylinder selector switch SW1 is turned off. As indicated by the broken line in FIG. 5, therefore, the following discharge circuit is formed as the discharge circuit for the piezoelectric actuator P1: a discharge circuit of "ground→the parasitic diode D1 of the cylinder selector switch SW1→the piezoelectric actuator P1→the inductor L1→the discharging switch SWb→ground." In FIG. 5, the resistor R1 (FIG. 1) is omitted.

Figure 6A:
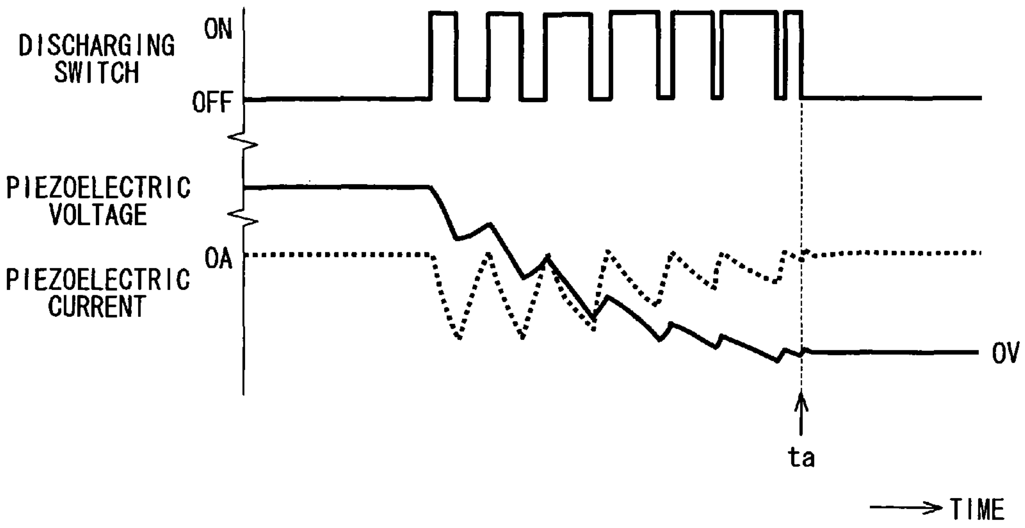
FIG. 6A is an operation diagram illustrating the effect of a conventional piezoelectric actuator driving device.
Figure 6B:
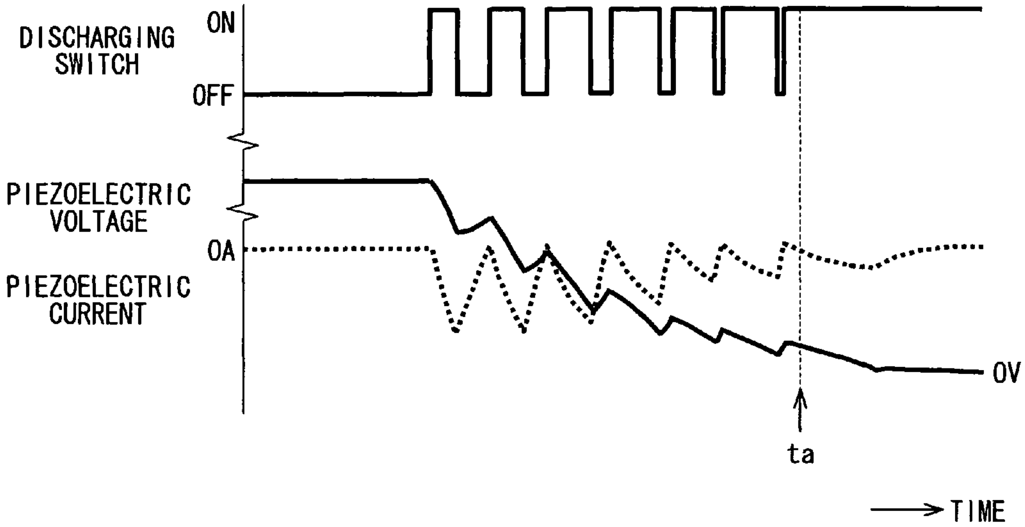
FIG. 6B is an operation diagram illustrating the effect of the first embodiment in comparison with the effect illustrated in FIG. 6A.

Therefore, as illustrated in FIG. 6B, even when the piezoelectric voltage (solid line) has not dropped to a value close to 0V at time ta when the discharging switching control is terminated: it is possible to discharge the piezoelectric actuator P1 without fail and to constantly make the piezoelectric voltage substantially equal to 0V before the charging switching control is started to drive the piezoelectric actuator P1 next. For this reason, the following response time can be prevented from being varied when the piezoelectric actuator P1 is driven next: the response time from when the charging switching control is started (the rising time of the driving signal) to when the piezoelectric actuator P1 is expanded to open the injector. As a result, accurate fuel injection can be carried out.

More specifically, in a conventional device, as illustrated in FIG. 6A, the discharging switch is fixed to the OFF state at time ta when the discharging switching control is terminated. For this reason, when the piezoelectric voltage is not 0V at time ta, this piezoelectric voltage remains higher than 0V until the next charging switching control is started. This varies the response time from when charging switching control is started to when the injector is actually opened. According to this embodiment, meanwhile, this problem is solved by keeping the discharging switch ON as illustrated in FIG. 6B. In FIGS. 6A and 6B, the piezoelectric current, which passes through the piezoelectric actuator, is indicated by the broken line with the direction of charging being taken as positive.

Thus, especially, the discharging switch is kept on until the next charging switching control is started. Therefore, even when the pressure is applied to the piezoelectric element of the piezoelectric actuator because of fuel pressure during the driving stop period, it is possible to prevent the piezoelectric voltage from being increased and to avoid variation in injection quantity.

In the driving device 60, in the driving stop period, the cylinder selector switch is turned off when the discharging switch is ON. Therefore, only the current in the direction of discharging is passed through the piezoelectric actuator Pn as indicated by the broken line in FIG. 5. Thus, an LC resonance circuit is restricted from being formed by the capacitive components of the piezoelectric actuator Pn and the inductor L1 or L2. For this reason, it is possible to prevent the piezoelectric voltage from being fluctuated by resonance in such an LC resonance circuit and to discharge the electric charges of the piezoelectric actuator Pn.

Further, in the driving device 60, the following operation is performed, as illustrated at part (3) in FIG. 2, when charging switching control is started: the discharging switch is turned off before the charging switch is turned on. Therefore, the charging switch and the discharging switch can be prevented from being simultaneously turned on to cause a through current flow.

In the above embodiment, the control unit 50 operates as a charge/discharge controlling means. The diodes Da, Dc operate as a first diode; the diodes Db, Dd operate as a second diode; and the diodes D1 to D4 operate as a third diode. The high-level driving signal is a drive command and the low-level driving signal is a drive stop command.

As a modification of the first embodiment, the discharging switch may be temporarily turned on during the driving stop period. For example, the discharging switch may be kept ON only for a certain time after the discharging switching control is terminated. Alternatively, the discharging switch may be turned off when discharging switching control is terminated, and thereafter it may be kept ON only for a certain time after a predetermined time has passed or until the next charging switching control is started. While the discharging switch is ON, the cylinder selector switch may be turned off to prevent the formation of the LC resonance circuit.

The condition for terminating the discharging switching control (discharge termination condition) need not be the condition that the charging voltage of a piezoelectric actuator has become equal to or lower than a discharge termination target value.

For example, the control unit 50 may be so constructed that it performs the following operation: when the discharging switching control is being carried out, it may measure the time that has lapsed after the discharging switching control was started (i.e., the falling time of the driving signal), as illustrated as part (2) in FIG. 3A; and when it determines that the lapsed time has reached a specified value, it determines that the discharge termination condition has been satisfied and terminates the discharging switching control.

For example, the control unit 50 may carry out the following control as the discharging switching control: the control to repeat the operation of keeping the discharging switch ON only for a certain on-period and keeping it OFF only for a certain off-period. Alternatively, it may carry out the control to repeat the operation of: keeping the discharging switch ON only for a certain on-period; turning off the discharging switch; and turning on the discharging switch again when the discharging current of the piezoelectric actuator is detected as having fallen to a preset switching-on threshold value. In these cases, that is, when the on-period of the discharging switch is constant in the discharging switching control, the condition illustrated at part (3) in FIG. 3B, that is, detection of current, may be taken as the discharge termination condition.

That is, the control unit 50 can be so constructed that it performs the following operation when it is carrying out discharging switching control: it detects the discharging current of the piezoelectric actuator when a certain on-period has passed after the discharging switch was turned on (that is, it detects the discharging current of the piezoelectric actuator immediately before the discharging switch is turned off); and when it determines that the discharging current has become equal to or lower than a specified value, it determines that the discharge termination condition has been satisfied and terminates the discharging switching control.

For example, the control unit 50 may carry out as the discharging switching control the control to repeat the operation of: causing the discharging switch to switch from ON to OFF when it determines that the discharging current of the piezoelectric actuator has become equal to or higher than a preset switching-off threshold value after the discharging switch was turned on; and causing the discharging switch to switch from OFF to ON when it determines that the discharging current has become equal to or lower than a preset switching-on threshold value. Alternatively, it may carry out the control to repeat the operation of: causing the discharging switch to switch from ON to OFF when the discharging current of the piezoelectric actuator has become equal to or higher than the preset switching-off threshold value after the discharging switch was turned on; and causing the discharging switch to switch from OFF to ON when a certain off-period has passed. In these cases, that is, when the condition for causing the discharging switch to switch from ON to OFF in the discharging switching control is the condition that the discharging current of a piezoelectric actuator has reached the switching-off threshold value, the following measure may be taken: the condition illustrated at part (4) in FIG. 3C may be taken as the discharge termination condition. This switching-off threshold value is a reference value.

That is, the control unit 50 can be so constructed that it performs the following operation when it is carrying out discharging switching control: it measures the time it takes for the discharging current of the piezoelectric actuator to reach the switching-off threshold value after the discharging switch is turned on; and when it determines that this time has become equal to or higher than a specified value, it determines that the discharge termination condition has been satisfied and terminates the discharging switching control.

Figure 3B:
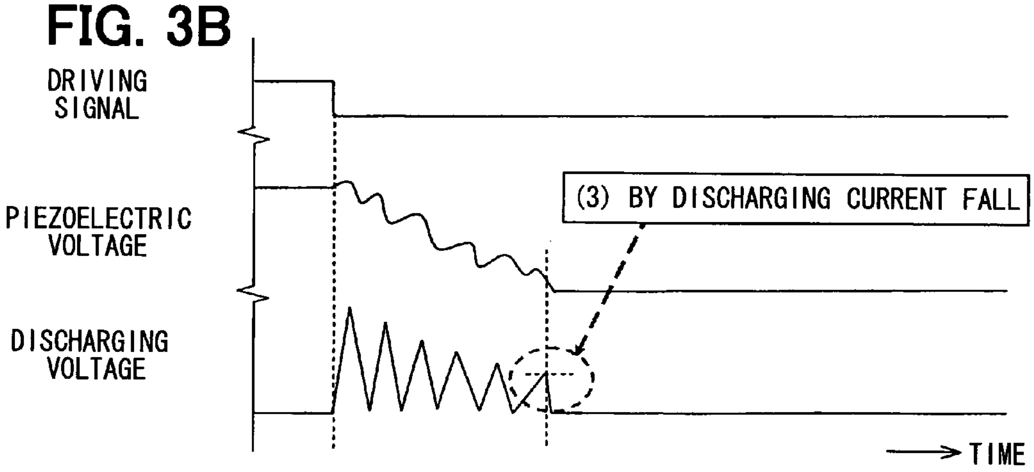
FIG. 3B is an operation diagram illustrating another discharge termination condition.
Figure 3C:
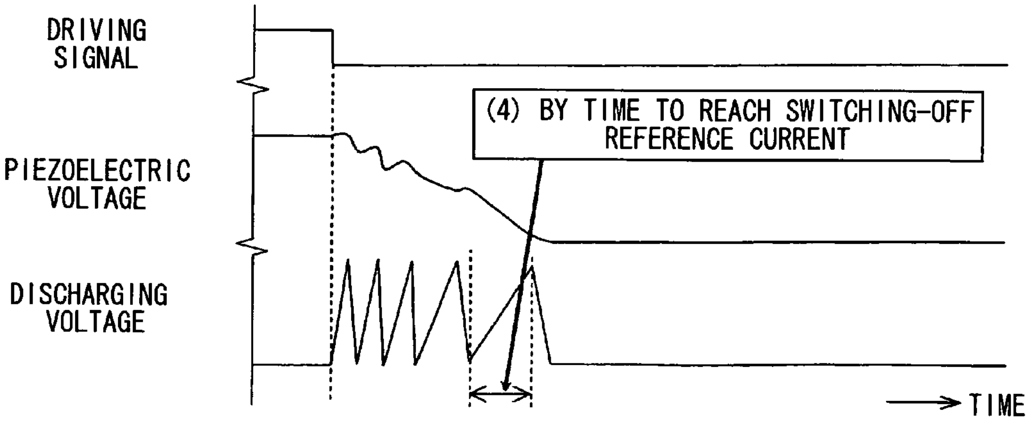
FIG. 3C is an operation diagram illustrating a further discharge termination condition.

Especially, when the discharge termination condition is the condition illustrated at part (3) in FIG. 3B or at part (4) in FIG. 3C, the discharge termination condition is satisfied when the discharging switch is ON. Therefore, the discharging switching control can be terminated when the discharging switch is ON without exception. This is advantageous for keeping the discharging switch ON since the termination of discharging switching control.

(Second Embodiment)

In a second embodiment illustrated in FIG. 7, the driving device 60 is differentiated from the first embodiment in the following points.

(1) The inductor L2, charging switch SWc, and the discharging switch SWd are not provided. The inductor L1 and the parallel circuit 11 (piezoelectric actuators P1, P3) of the first group are connected with each other through a switch SW5. The inductor L1 and the parallel circuit 12 (piezoelectric actuators P2, P4) of the second group are connected with each other through a switch SW6. That is, the driving device 60 is provided with only a set of the inductor L1, the charging switch SWa, and the discharging switch SWb. The inductor L1 is connected switchably to either of the parallel circuits 11, 12 of the two groups by the switches SW5, SW6. The group of piezoelectric actuators connected in series with the inductor L1 is switched between the first group and the second group. For this reason, hereafter, the switches SW5, SW6 will be designated as group selector switches. When the engine is a V-type of two banks and the first group and the second group of cylinders are cylinder groups of respective banks of the V-engine, the switches having the same role as that of the group selector switches SW5, SW6 are designated as bank selector switches.

Each of the group selector switches SW5, SW6 is constructed by connecting two MOSFETs together in series so that the cathodes of their parasitic diodes face each other. That is, the group selector switch SW5 on the first group side is constructed with: MOSFET as a first switch SW5*a* whose source is connected to one end of the inductor L1; and MOSFET as a second switch SW5*b* whose source is connected to one end of the parallel circuit 11 and whose drain is connected to the drain of the first switch SW5*a*. Similarly, the group selector switch SW6 on the second group side is constructed with: MOSFET as a first switch SW6*a* whose source is connected to one end of the inductor L1; and MOSFET as a second switch SW6*b* whose source is connected to one end of the parallel circuit 12 and whose drain is connected to the drain of the first switch SW6*a*.

When the two switches SW5*a*, SW5*b* forming the group selector switch SW5 are turned on, the inductor L1 and the parallel circuit 11 of the first group are connected together. When the two switches SW6*a*, SW6*b* forming the group selector switch SW6 are turned on, the inductor L1 and the parallel circuit 12 of the second group are connected together.

Here the group selector switch SW5 is described in detail as an example. When at least the first switch SW5*a* of the first and second switches SW5*a*, SW5*b* forming the switch SW5 is turned on, a discharging current can be led to flow from the parallel circuit 11 side (the side of the piezoelectric actuators P1, P3) to the inductor L1 side through the parasitic diode D5*b* of the second switch SW5*b* and the first switch SW5*a*. When at least the second switch SW5*b* of the first and second switches SW5*a*, SW5*b* is turned on, a charging current can be led to flow from the inductor L1 side to the parallel circuit 11 side (the side of the piezoelectric actuators P1, P3) through the parasitic diode D5*a* of the first switch SW5*a* and the second switch SW5*b*.

For this reason, hereafter, the first switches SW5*a*, SW6*a* will be referred to as discharge enabling switches and the second switches SW5*b*, SW6*b* will be referred to as charge enabling switches. The parasitic diodes D5*a*, D6*a* of the discharge enabling switches SW5*a*, SW6*a* correspond to charge enabling diode; and the parasitic diodes D5*b*, D6*b* of the charge enabling switches SW5*b*, SW6*b* correspond to discharge enabling diode. The group selector switches SW5, SW6 correspond to series circuit forming switch.

(2) The control unit 50 recognizes a period for which multistage injection into any cylinder (hereafter, referred to as #n) should be carried out. The start time of this period is when the driving signal for #n becomes high for the first time, that is, when the signal becomes high for the first injection of multistage injection. The end time of this period is when the driving signal for the cylinder into which fuel should be injected subsequent to injection in #n becomes high for the first time. The control unit 50 recognizes the following period as the period for which multistage injection into #1 should be carried out: the period from when the driving signal for #1 becomes high for the first time to when the driving signal for #2 becomes high for the first time.

Figure 8:
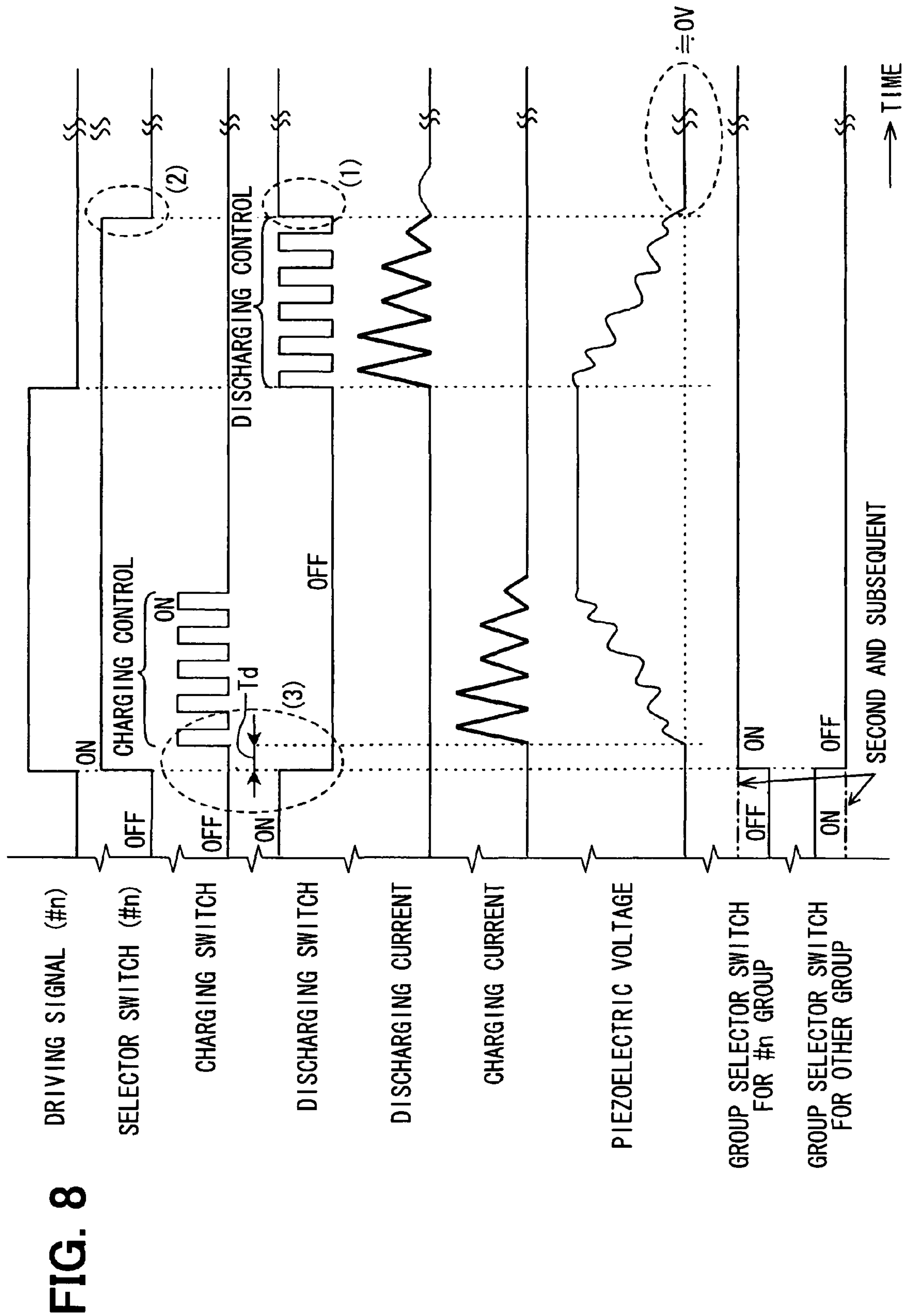
FIG. 8 is an operation diagram illustrating the operation of a control unit in the second embodiment.

As illustrated in FIG. 8, the control unit 50 performs the following operation during the period for which multistage injection into #n should be carried out: it turns on the group selector switch of the group of #n of the group selector switches SW5, SW6 and turns off the group selector switch of the other group. More specifically, during the period for which multistage injection into #1 or #3 should be carried out, the control unit 50 turns on the group selector switch SW5 of the first group. During the period for which multistage injection into #2 or #4 should be carried out, it turns on the group selector switch SW6 of the second group.

Turning on the group selector switch SW5 or SW6 means turning on both the discharge enabling switch SW5*a* or SW6*a* and the charge enabling switch SW5*b* or SW6*b* forming that group selector switch SW5 or SW6. Turning off the group selector switch SW5 or SW6 means turning off both the discharge enabling switch SW5*a* or SW6*a* and the charge enabling switch SW5*b* or SW6*b* forming that group selector switch SW5 or SW6. FIG. 8 illustrates the operation that occurs when the following transition takes place: transition from a period for which multistage injection into a cylinder into which fuel is injected prior to #n should be carried out to a period for which multistage injection into #n should be carried out. That is, FIG. 8 illustrates the operation that occurs when the driving signal for #n is changed to high for the first time. When the driving signal for #n is changed high for the second and following injections of multistage injection, the operation indicated by alternate long and short dash lines at the lower left of FIG. 8 occurs. That is, the group selector switch for the group of #n is kept ON and the group selector switch for the other group is kept OFF.

Further, the control unit 50 controls the charging switch SWa and the discharging switch SWb and the cylinder selector switches SW1 to SW4 for the respective cylinders as in the first embodiment.

When the driving signal for #n is changed to high for the first time, as illustrated in FIG. 8, it turns on the cylinder selector switch SWn and further causes the discharging switch SWb to switch from ON to OFF. It waits for a delay time Td and then starts turning on and off the charging switch SWa by the charging switching control. When the driving signal for #n returns from high to low, it carries out the discharging switching control to turn on and off the discharging switch SWb with the charging switch SWa kept OFF. The control unit 50 operates as illustrated at parts (1) and (2) in FIG. 8 and FIG. 4. That is, when it determines that the discharge termination condition has been satisfied while it is carrying out the discharging switching control (S110: YES), it turns on the discharging switch SWb to terminate the discharging switching control (S120). Further, it turns off the cylinder selector switch SWn that has been ON so far (S130). When the driving signal for #n is changed to high again next during a period for which multistage injection into #n should be carried out, it performs the same operation again as the operation performed since the driving signal for #n was driven high for the first time.

Also with the driving device 60 in the second embodiment, the same effect as in the first embodiment can be provided. The reason for this is as follows: during a driving stop period in the period for which multistage injection into #n should be carried out, the discharging switch SWb is turned on and further the group selector switch SW5 or SW6 for the group of #n is also turned on; and as a result, a current pathway for discharging the piezoelectric actuator Pn is formed.

When the discharging switch SWb is temporarily turned on during the driving stop period, the following measure may be taken: during that driving stop period, the group selector switch SW5 or SW6 corresponding to the piezoelectric actuator Pn to be discharged is turned on only when the discharging switch SWb is ON.

(Third Embodiment)

Figure 7:
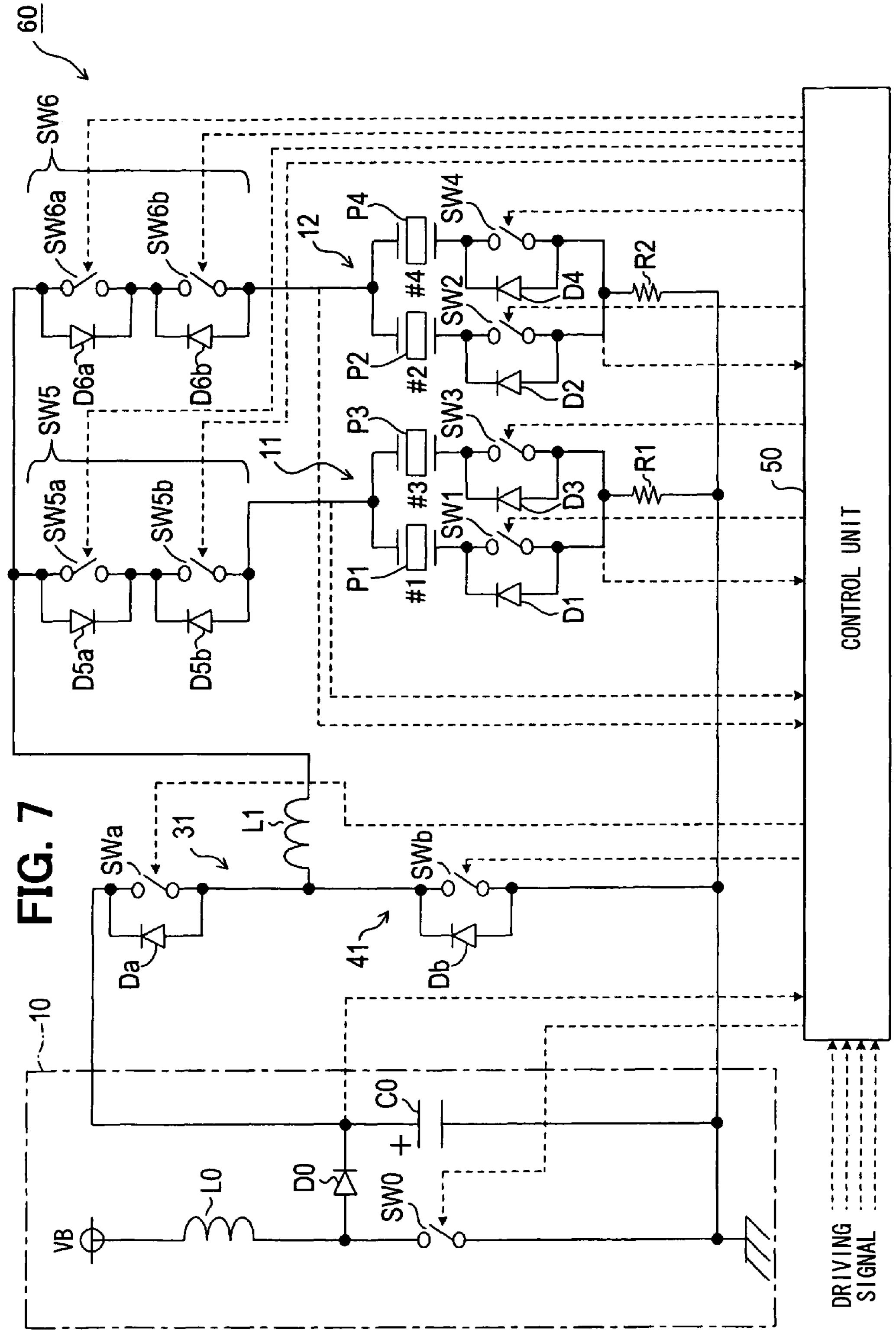
FIG. 7 is a block diagram illustrating a piezoelectric actuator driving device according to a second embodiment.

In a third embodiment, the driving device 60 is constructed in the same circuit configuration as the second embodiment illustrated in FIG. 7. However, the driving device 60 in the third embodiment is differentiated only in the point of controlling the group selector switches SW5 and SW6 as illustrated in FIG. 9.

That is, during the period for which multistage injection into #n should be carried out, the control unit 50 does not turn on both the charge enabling switch and the discharge enabling switch forming the group selector switch for the group of #n. Instead, it turns on the charge enabling switch and the discharge enabling switch as follows: when the driving signal for #n is high, the control unit 50 turns on only the charge enabling switch; and when the driving signal for #n is low, it turns on only the discharge enabling switch.

Figure 9:
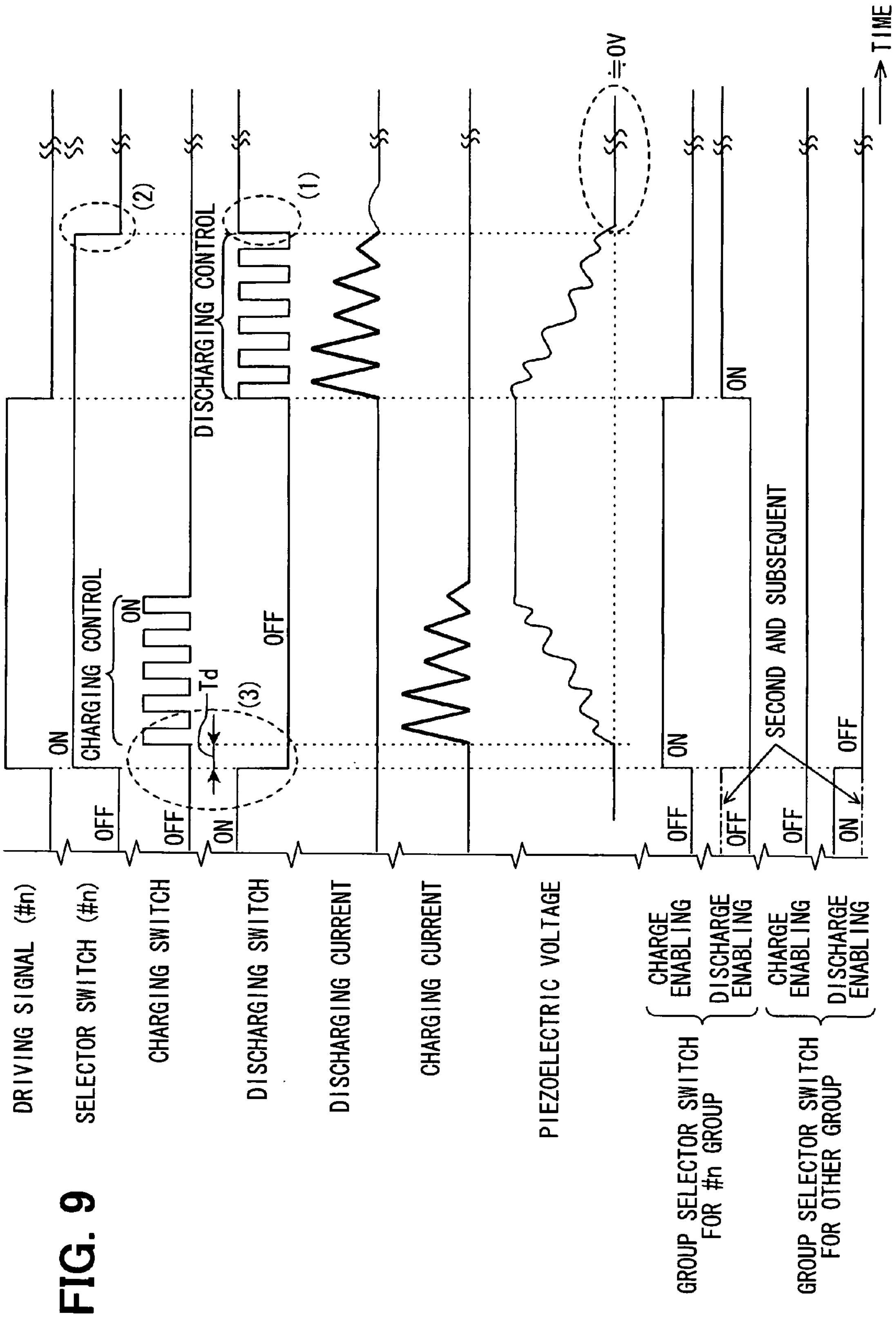
FIG. 9 is an operation diagram illustrating the operation of a control unit according to a third embodiment.
Figure 10A:
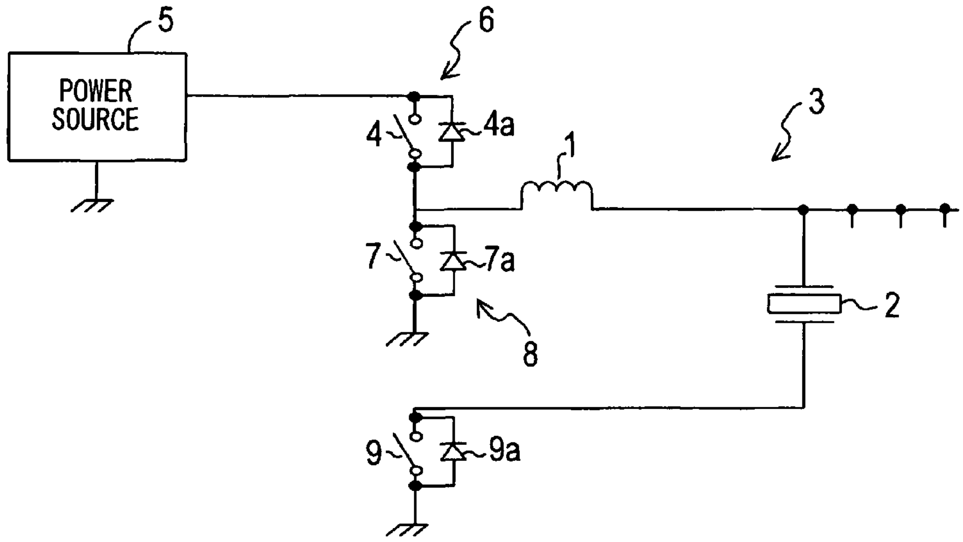
FIG. 10A is a block diagram illustrating a conventional piezoelectric actuator driving device.
Figure 10B:
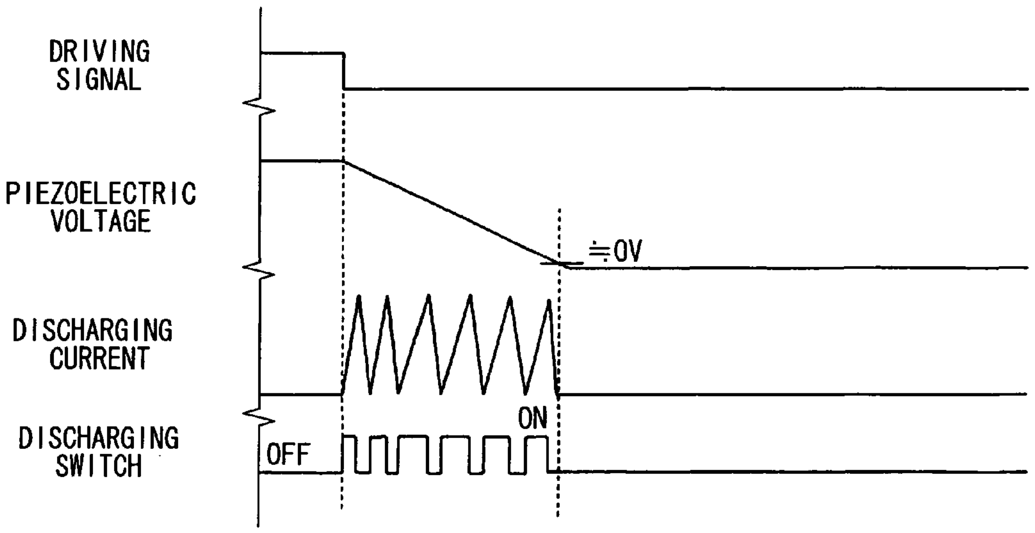
FIG. 10B is an operation diagram illustrating the operation of the conventional driving device.
Figure 11A:
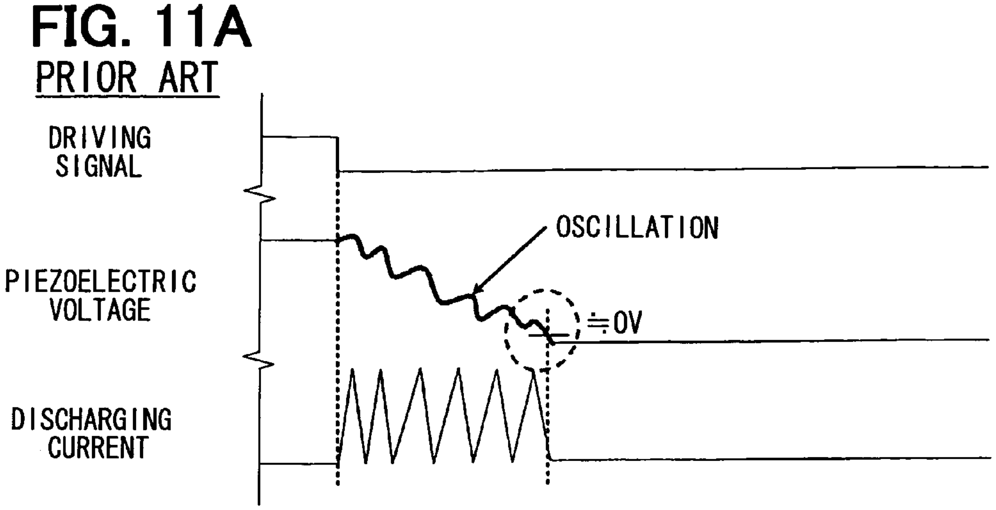
FIG. 11A is another operation diagram illustrating the operation of the conventional driving device.
Figure 11B:
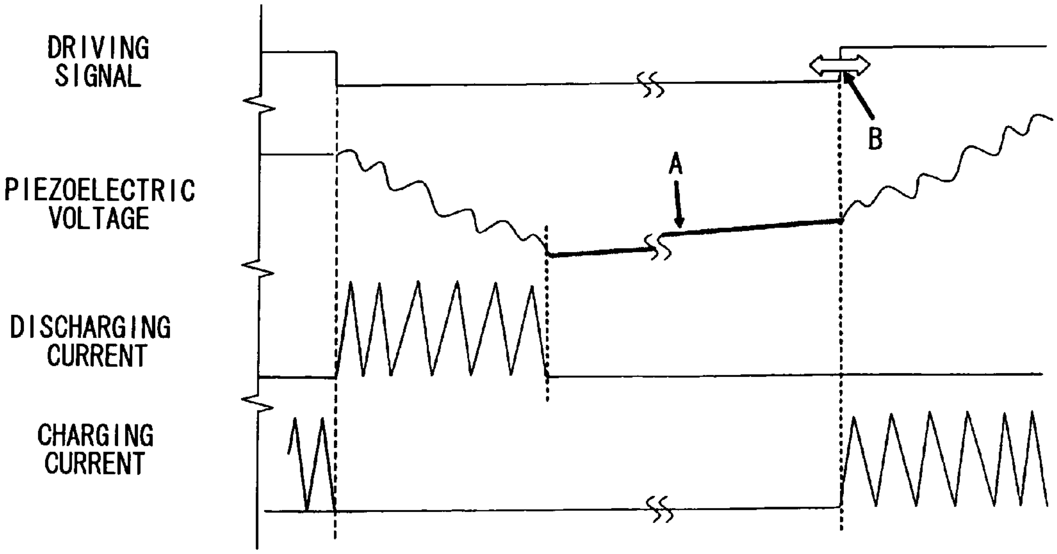
FIG. 11B is a further operation diagram illustrating the operation of the conventional driving device.

Similarly with FIG. 8, FIG. 9 also illustrates the situation that occurs when the driving signal for #n is changed high for the first time. When the driving signal for #n is changed high for the second and following injections of multistage injection, the situation indicated by alternate long and short dash lines at the lower left of FIG. 9 occurs. That is, the discharge enabling switch forming the group selector switch for the group of #n changes from ON to OFF and the discharge enabling switch forming the group selector switch for the other group is kept OFF.

In this third embodiment, the following operation is performed when the driving signal for #n is changed to high during a period for which multistage injection into #n should be carried out and charging switching control is carried out: of the discharge enabling switch and the charge enabling switch forming the group selector switch for the group of #n, the charge enabling switch is turned on; and as a result, the pathway of charging current from the inductor L1 to the piezoelectric actuator Pn is formed.

The following operation is performed when the driving signal for #n changes from high to low during the period for which multistage injection into #n should be carried out and the discharging switching control is carried out: of the discharge enabling switch and the charge enabling switch forming the group selector switch for the group of #n, the discharge enabling switch is turned on; and the pathway of discharging current from the piezoelectric actuator Pn to the inductor L1 is formed.

Also during the driving stop period in the period for which multistage injection into #n should be carried out, the following takes place: of the discharge enabling switch and the charge enabling switch forming the group selector switch for the group of #n, the discharge enabling switch is turned on; and as a result, the pathway of the discharging current from the piezoelectric actuator Pn to the inductor L1 is formed. During this driving stop period, the discharging switch SWb is turned on as in the first and second embodiments.

Therefore, also with the driving device 60 in the third embodiment, the same effect as with the driving devices 60, 70 in the first and second embodiments can be provided.

When the discharging switch SWb is ON during the driving stop period, only the discharge enabling switch of the group selector switch is turned on. Even if the cylinder selector switch SWn is not turned off, therefore, only a current in the direction of discharging is passed through the piezoelectric actuator Pn because of the parasitic diode D5*b* or D6*b* of the charge enabling switch. Thus, an LC resonance circuit can be restricted from being formed by the inductor L1 and the capacitive components of the piezoelectric actuator Pn.

If the third embodiment is modified so that the discharging switch SWb is temporarily turned on during the driving stop period, the following measure may be taken: during that driving stop period, the discharge enabling switch of the group selector switch corresponding to the piezoelectric actuator Pn to be discharged is turned on only when the discharging switch SWb is ON.

The third embodiment may be so constructed that the following operation is performed during the driving period from when the driving signal for #n is changed to high to when the discharging switching control is terminated: both the discharge enabling switch and the charge enabling switch forming the group selector switch corresponding to #n are turned on as in the second embodiment.

The present invention is not limited to these embodiments and may be embodied in various ways.

For example, the piezoelectric actuators P1 to P4 may not be grouped and only one set of an inductor, a charging switch, and a discharging switch may be provided. That is, the circuitry may be constructed without the inductor L2, charging switch SWc, and discharging switch SWd in the circuitry in FIG. 1 and connecting the parallel circuit 12 of the piezoelectric actuators P2, P4 to the inductor L1.

Conversely, the circuitry may be constructed by providing each of the piezoelectric actuators P1 to P4 with an inductor, a discharging switch, and a charging switch.

The driving device is not limited to the fuel injection system for diesel engines, and it may also be applied to a fuel injection system for gasoline engines.

The piezoelectric actuator is not limited to open and close an injector but may be applied to other systems.

What is claimed is:

1. A piezoelectric actuator driving device comprising:

an inductor connected in series with a piezoelectric actuator;

a charging path for supplying power from a positive side of a direct current power supply to a series circuit of the inductor and the piezoelectric actuator through a charging switch;

a discharging path connected in parallel with the series circuit for discharging charged electric charges of the piezoelectric actuator through a discharging switch;

a first diode connected in parallel with the charging switch so that a cathode thereof is connected on a positive side of the direct current power supply;

a second diode connected in parallel with the discharging switch so that an anode thereof is connected on a negative side of the direct current power supply;

a charge/discharge controlling means for carrying out charging switching control to repeatedly turn on and off the charging switch with the discharging switch kept OFF and thereby charging and expanding the piezoelectric actuator when a drive command is externally inputted, and for carrying out discharging switching control to repeatedly turn on and off the discharging switch with the charging switch kept OFF and thereby discharging and contracting the piezoelectric actuator when a drive stop command is externally inputted, wherein the charge/discharge controlling means is configured to turn on the discharging switch in a period from when the discharging switching control is terminated to when the charging switching control is started next;

a selector switch, connected between the piezoelectric actuator on the opposite side to the inductor and the negative side of the direct current power supply, for selecting the piezoelectric actuator as an object to be driven; and a third diode connected in parallel with the selector switch so that an anode thereof is connected to the negative side of the direct current power supply circuit, wherein the charge/discharge controlling means turns on the selector switch in carrying out the charging switching control and the discharging switching control to drive the piezoelectric actuator and turns off the selector switch when the discharging switch is ON during the period from when the discharging switching control is terminated to when the charging switching control is started next.

2. The piezoelectric actuator driving device of claim 1, wherein:

the charge/discharge controlling means is configured to continuously keep the discharging switch ON during a period from when the discharging switching control is terminated to when the charging switching control is started next.

3. The piezoelectric actuator driving device of claim 2, wherein:

the charge/discharge controlling means is configured to first cause, at start of the charging switching control, the discharging switch to switch from ON to OFF before causing the charging switch to switch from OFF to ON and thereafter starts turning on and off the charging switch.

4. The piezoelectric actuator driving device of claim 1, further comprising:

a series circuit forming switch for connecting the inductor and the piezoelectric actuator in series, wherein the charge/discharge controlling means is configured to turn on the series circuit forming switch in carrying out the charging switching control and the discharging switching control to drive the piezoelectric actuator and to turn on the series circuit forming switch also when the discharging switch is ON during the period from when the discharging switching control is terminated to when the charging switching control is started next.

5. The piezoelectric actuator driving device of claim 4, wherein:

the series circuit forming switch includes a discharge enabling switch and a charge enabling switch connected in series with each other, and a charge enabling diode connected with the discharge enabling switch provided on the inductor side of the two switches so that an anode thereof is connected on the inductor side and a discharge enabling diode connected in parallel with the charge enabling switch provided on the piezoelectric actuator side so that an anode thereof is connected on the piezoelectric actuator side; and the charge/discharge controlling means is configured to turn on only the discharge enabling switch of the discharge enabling switch and the charge enabling switch forming the series circuit forming switch, when the discharging switch is ON during the period from when the discharging switching control is terminated to when the charging switching control is started next.

6. The piezoelectric actuator driving device of claim 1, wherein the charge/discharge controlling means is configured to terminate the discharging switching control when a specific discharge termination condition is satisfied after start of the discharging switching control.

7. The piezoelectric actuator driving device of claim 6, wherein the charge/discharge controlling means is configured to monitor a charging voltage of the piezoelectric actuator in carrying out the discharging switching control, and terminate the discharging switching control when a monitored charging voltage becomes equal to or lower than a specified value.

8. The piezoelectric actuator driving device of claim 6, wherein the charge/discharge controlling means is configured to measure time that lapses from start of the discharging switching control, and terminate the discharging switching control when measured time reaches a specified value.

9. The piezoelectric actuator driving device of claim 6, wherein the charge/discharge controlling means is configured to keep on-time of the discharging switch at a fixed value when the discharging switch is turned on and off in the discharging switching control, and wherein the charge/discharge controlling means is configured to detect a discharging current of the piezoelectric actuator when fixed on-time passes after the discharging switch was turned on in carrying out the discharging switching control, and terminate the discharging switching control when detected discharging current becomes equal to or lower than a specified value.

10. The piezoelectric actuator driving device of claim 6, wherein the charge/discharge controlling means is configured to monitor discharging current of the piezoelectric actuator after the discharging switch was turned on in turning on and off the discharging switch in the discharging switching control, and turn off the discharging switch when a monitored discharging current reaches a reference value, and wherein the charge/discharge controlling means is configured to measure time for the discharging current of the piezoelectric actuator to reach the reference value after the discharging switch is turned on in carrying out the discharging switching control, and terminate the discharging switching control when measured time becomes equal to or higher than a specified value.

* * * * *